US011477039B2

(12) United States Patent
Cambou et al.

(10) Patent No.: US 11,477,039 B2
(45) Date of Patent: *Oct. 18, 2022

(54) RESPONSE-BASED CRYPTOGRAPHY USING PHYSICAL UNCLONABLE FUNCTIONS

(71) Applicant: Arizona Board of Regents on Behalf of Northern Arizona University, Flagstaff, AZ (US)

(72) Inventors: Bertrand F Cambou, Flagstaff, AZ (US); Christopher R Philabaum, Flagstaff, AZ (US); Dennis D Booher, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/598,985

(22) Filed: Oct. 10, 2019

(65) Prior Publication Data

US 2020/0119932 A1    Apr. 16, 2020

Related U.S. Application Data

(60) Provisional application No. 62/744,437, filed on Oct. 11, 2018.

(51) Int. Cl.
*H04L 9/32* (2006.01)
*H04L 9/08* (2006.01)
(Continued)

(52) U.S. Cl.
CPC .......... *H04L 9/3278* (2013.01); *H04L 9/0618* (2013.01); *H04L 9/0861* (2013.01); *H04L 9/30* (2013.01); *H04L 9/50* (2022.05)

(58) Field of Classification Search
CPC ... H04L 9/3278; H04L 9/0861; H04L 9/0618; H04L 9/30; H04L 2209/38; H04L 63/08; H04L 9/3239; H04L 9/0866
See application file for complete search history.

(56) References Cited

U.S. PATENT DOCUMENTS 8,300,450 B2    10/2012    Christensen et al.
2012/0131340 A1*    5/2012    Teuwen ............... H04L 9/3278
713/168

(Continued)

FOREIGN PATENT DOCUMENTS

WO    2015105687 A    7/2015

OTHER PUBLICATIONS

Cambou, B. et al., Physically Unclonable Functions with Multi-states and Machine Learning, 14th Inter. Workshop CryptArchi, France; 2016.

(Continued)

*Primary Examiner* — J. Brant Murphy
(74) *Attorney, Agent, or Firm* — Quarles & Brady LLP (57) ABSTRACT

Systems and methods of authentication and encrypted communication between a server and client devices using independently-generated shared encryptions keys are disclosed. Client devices with arrays of physical-unclonable-function devices are respond to challenges from a server. Characteristics of the arrays are stored by the server during a secure enrollment process. Subsequently, the server issues challenges to the clients. The clients derive encryption keys from their responses to those challenges generated by the clients from characteristics of portions of the arrays specified by the challenges. The clients send messages encrypted with the client-generated encryption keys to the server. The server uses the stored characteristics to independently reproduce the client-generated encryption key. When the server-generated encryption key matches the client-generated key, the (Continued)

clients may be authenticated and the clients can communicate securely with the server without exchanging encryption keys. Ternary PUF characterization schemes may be used to achieve acceptable authentication error rates.

20 Claims, 8 Drawing Sheets

(51) Int. Cl.
    *H04L 9/06*            (2006.01)
    *H04L 9/30*            (2006.01)
    *H04L 9/00*            (2022.01)

(56) References Cited

U.S. PATENT DOCUMENTS

| | | | | |
|---|---|---|---|---|
| 2012/0204023 | A1* | 8/2012 | Kuipers | H04L 9/0866 713/150 |
| 2013/0194886 | A1* | 8/2013 | Schrijen | G11C 7/24 365/226 |
| 2015/0071432 | A1 | 3/2015 | Zhu et al. | |
| 2016/0078252 | A1* | 3/2016 | Chandra | G06F 21/72 713/190 |
| 2017/0141929 | A1* | 5/2017 | Afghah | H04L 9/3278 |
| 2017/0310489 | A1* | 10/2017 | Van Der Sluis | H04L 9/30 |
| 2018/0129801 | A1* | 5/2018 | Cambou | H04L 9/0643 |
| 2018/0131529 | A1* | 5/2018 | Cambou | H04L 9/0662 |
| 2018/0329962 | A1* | 11/2018 | Schrijen | G06F 16/2468 |
| 2018/0351754 | A1* | 12/2018 | Wallrabenstein | H04L 9/085 |
| 2019/0138753 | A1* | 5/2019 | Wallrabenstein | H04L 9/3278 |

OTHER PUBLICATIONS

Cambou, B. et al., PUF designed with Resistive RAM and Ternary States, CISR 2016.

Delvaux, J. et al., Helper Data Algorithms for PUF-Based Key Generation: Overview and Analysis, IEEE Transaction on Computer-Aided Design of Integrated Circuits and Systems, vol. 34, pp. 889-902, 2015.

Gao, Y. et al., Emerging Physical Unclonable Functions with Nanotechnology, IEEE Access, vol. 4, pp. 61-80, 2016.

Gassend, B. et al., Silicon Physical Random Functions, Proceedings of the 9th ACM Conference on Computer and Communications Security, pp. 148-160, 2022.

Guajardo, J. et al, FPGA Intrinsic PUFs and Their Use for IP Protection, CHES 2007, LNCS 4727, pp. 63-80, 2007.

Herder, C. et al., Physical Unclonable Functions and Applications: A Tutorial, Proceedings of the IEEE, vol. 102, No. 8, pp. 1126-1141, 2014.

Hiller, H. et al. Breaking through Fixed PUF Block Limitations with Differential Sequence Coding and Convolutional Codes, TrustED '13, pp. 43-54, 2013.

Holcomb, D. E. et al., Power-up SRAM States as an Identifying Fingerprint and Source of True Random Numbers, IEEE Transactions on Computers, vol. 57, No. 11, 2008.

Korenda, A., et al., A Secret Key Generation Scheme for Internet of Things using Ternary-States ReRAM-based Physical Unclonable Functions, 2018 14th International Wireless Communications & Mobile Computing, pp. 1261-1266, 2018.

Maes, R. et al., Physically Unclonable Functions: A Study on the State of the Art and Future Research Directions, Towards Hardware-Intrinsic Security, 2010.

Pappu, R. et al., Physical One-Way Functions, Science, vol. 297, No. 5589, pp. 2026-2030, 2002.

Prabhu, P et al, Extracting Device Fingerprints from Flash Memory by Exploiting Physical Variations, TRUST, 2011.

Vatajelu, E. I. et al., STT-MRAM-Based PUF Architecture Exploiting Magnetic Tunnel Junction Fabrication-Induced Variability, ACM J. Emerg. Technol. Comput. Syst., vol. 13, No. 1, Art. 5, 2016.

\* cited by examiner

RESPONSE-BASED CRYPTOGRAPHY USING PHYSICAL UNCLONABLE FUNCTIONS

CROSS-REFERENCE TO RELATED APPLICATIONS

The present application claims priority to U.S. Provisional Application 62/744,437 entitled "Response-Based Cryptography with Physical Unclonable Functions" and filed on Oct. 11, 2018.

BACKGROUND OF THE INVENTION

Physical unclonable functions (PUFs) that are unique to a device allow an authentication system to challenge a client seeking authentication, receive a response generated by the client using a PUF device, and then compare the received with a stored response previously received from the client or derived from characteristics of the PUF device and verifying that the two responses match. PUF technologies take advantage of unique characteristics of each device caused by natural manufacturing variations unique to that device. When clients seeking authentication have arrays of PUF devices, a number of possible challenge responses may be generated in response to varying challenges. The generation of challenge responses may need to be reproducible, predictable, and easy to recognize during the authentication process for the challenge-response authentication to be useful.

BRIEF SUMMARY

In an example embodiment a method comprises selecting, as an authentication challenge, a first enrollment challenge retrieved from a database and belonging to a challenge-response pair associated with a client device possessing a physical-unclonable-function ("PUF") array having a plurality of PUF devices. The method further comprises determining an expected response to the authentication challenge using an enrollment response belonging to the challenge-response pair from the database previously generated in response to the enrollment challenge by measuring physical characteristics of PUF devices of a portion of the PUF array identified by the enrollment challenge. The method further comprises issuing the authentication challenge to the client device; receiving a message identifying a ciphertext from the client device; determining, using the ciphertext and a server-generated encryption key, that a value of a difference metric indicating a degree of difference between the authentication response and the expected response is less than a predetermined maximum value of the difference metric; and transmitting a notification to the client device indicating that the client device has been successfully authenticated.

In some such embodiments the message identifying the ciphertext may identify a transaction block belonging to a blockchain. The method may further comprise retrieving the transaction block identified by the message from the blockchain and selecting an expected authentication message associated with the client device from the transaction block. Determining that the value of the difference metric between the authentication response and the expected response is less than the predetermined maximum value of the difference metric may comprise deriving a cryptographic value using the server-generated encryption key and determining that the cryptographic value matches the authentication message.

In another example embodiment, a device comprises a processor, and memory coupled to the processor. The memory stores challenge-response pairs. Each challenge-response pair is associated with one of a plurality of client devices each having a respective physical-unclonable-function ("PUF") array having pluralities of PUF devices. Each challenge response pair includes an enrollment challenge issued to an associated client device and an initial response to that enrollment challenge obtained from the associated client device and derived from measurements of physical characteristics of PUF devices belonging to the PUF array of the associated client device.

The memory also stores executable instructions that, when executed by the processor, cause the processor to select, as an authentication challenge, a first enrollment challenge belonging to a challenge-response pair associated with a client device; and issue the authentication challenge to the client device; determine an expected response to the authentication challenge using the initial response belonging to the challenge-response pair associated with the client device; receive a ciphertext generated by the client device with a client-generated encryption key; determine that the authentication response is consistent with the expected response using the received ciphertext; and transmit a notification to the client device indicating that the client device has been successfully authenticated.

In another example embodiment, a system comprises a processor, a physical-unclonable-function ("PUF") array of PUF devices, and memory coupled to the processor. The memory stores instructions that, upon execution by the processor, cause the processor to transmit an authentication request to a server and receive an authentication challenge from the server in response to the authentication request; measure physical characteristics of PUF devices forming a portion of the PUF array specified by the authentication challenge; generate an authentication response based on the measured physical characteristics and transmit the authentication response to the server; derive an encryption key from the authentication response; transmit an expected authentication message to the server as a ciphertext encrypted with the client-generated encryption key; and encrypt further communication with the server using the client-generated encryption key in response to receiving a message confirming successful authentication from the server.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

Conventional systems and methods for challenge-response authentication have disadvantages. For example, when the server and the client communicate over an insecure channel, both the challenges and the challenge responses may be intercepted, providing information which may be useful to an attacker. In addition, conventional PUF-based challenge response systems may experience errors due to nondeterministic behavior of individual devices in PUF arrays. Even if these error rates are acceptable for authentication purposes, they are often much too high for other applications such as allowing two devices to agree on a shared encryption key.

Accordingly, embodiments disclosed herein address these and other shortcomings by using physical unclonable function (PUF) generators (APGs) with improved error rates to enable simultaneous authentication of client devices and generation of effectively-one-time encryption keys, thereby allowing one or more devices to reliably exchange information securely over potentially insecure channels without requiring excessive latencies and use of computing resources.

In the context of this disclosure, a challenge is any information transmitted to an APG to cause production of an expected response (referred to as a "challenge response") corresponding to that information. Challenge responses may be generated by accessing devices (or ranges of devices) in an array of PUF devices belonging to the APG. Along these lines, a challenge may be input supplied to an APG which is used to produce a response having one or more expected values which depend upon characteristics' of the PUF array belonging to the APG to which the challenge is issued. The appropriate challenge response may be derived from those characteristics using instructions stored by the APG or other processing circuitry, received by the APG or other processing circuitry and/or additional information supplied to the APG or other processing circuitry (such as a password of a user). In one simple non-limiting example, a challenge might simply be returning the values stored by devices of a PUF array at a specified address or range of addresses. In other non-limiting examples, a challenge might include instructions to perform a mathematical, logical, or other operation(s) on those values.

Non-limiting examples of measurable physical characteristics of devices used in PUF arrays are time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., "0" or "1") after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the "0" or "1" state could be used as a characteristic of that device. Other non-limiting examples of suitable characteristics include optical measurements. For instance, a PUF device may be an optical PUF device which, when illuminated by a light source such as a laser, produces a unique image. This image may be digitized and the pixels may be used as an addressable PUF array. A good PUF should be predictable, and subsequent responses to the same challenge should be similar to each other (and preferably identical). The quantification of the quality of the PUF may be given by the Hamming distances (or another similarity metric) between initial responses and subsequent responses, also defined as the challenge-response pair (CRP) error rate. Hamming distance is used throughout this disclosure as a useful measure of the similarity or difference between two strings (such as challenges and responses). However, it should be understood that other measures of the similarity or difference between two strings may be used and that Hamming distances are used herein for the purposes of illustration. The Hamming distance may be particularly useful when PUF responses are sequential strings with each element generated by accessing a distinct PUF device belonging to an array. In this instance, the Hamming distance between a response to a challenge and an earlier response (or expected response) to that same challenge will indicate the number of PUF devices which produced unexpected outputs.

According to various embodiments, a PUF-enabled authentication protocol includes the following stages: (1)

Figure 1:
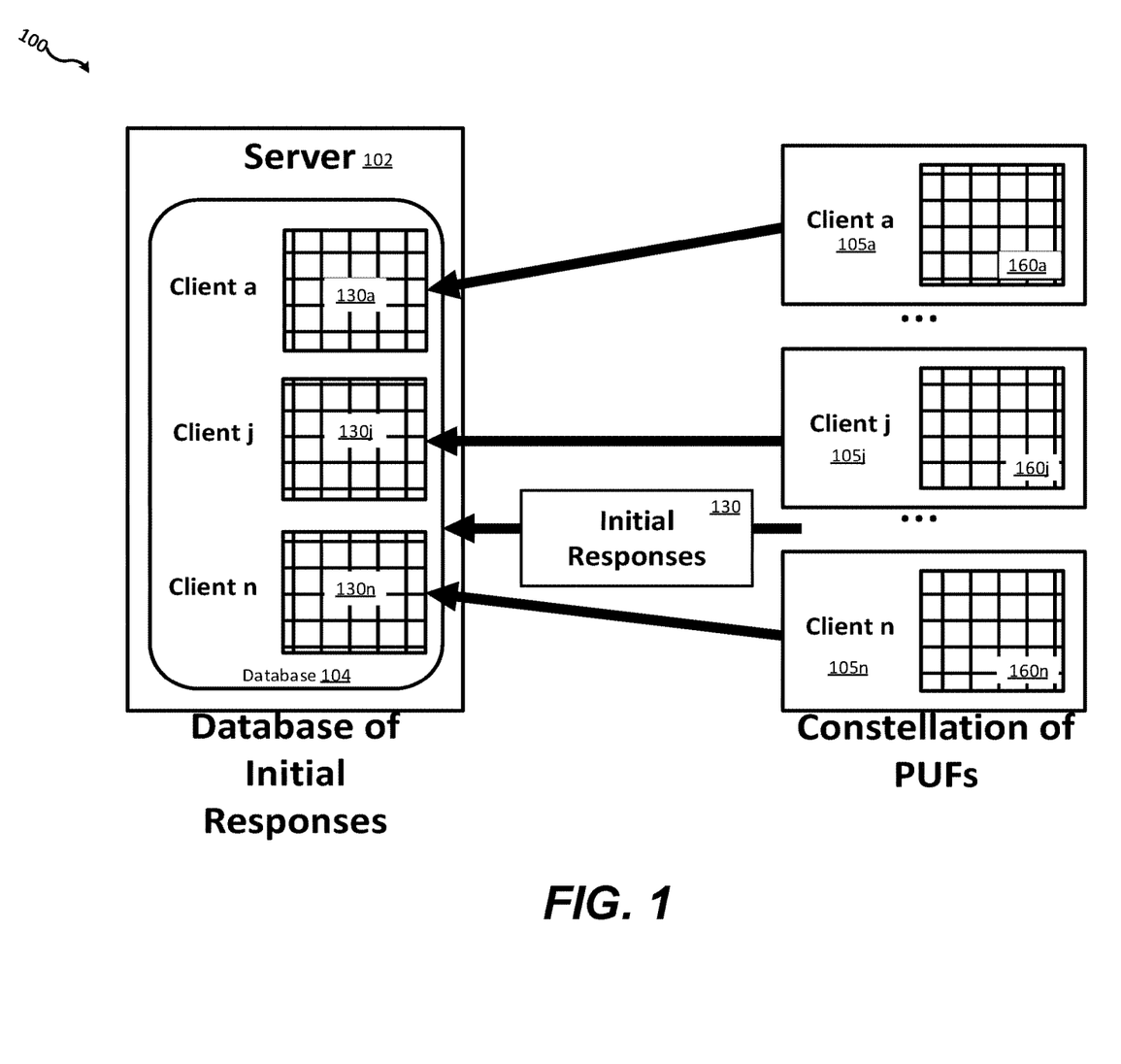
FIG. 1 depicts an enrollment procedure wherein a server issues challenges to clients having PUF arrays and stores responses to those challenges for use in subsequent authentication of the clients, according to one embodiment.

Enrollment, (2) Handshaking, and (3) Authentication/Encryption Key generation. These stages are described below, beginning with reference to FIG. 1 illustrating an example environment 100 in which embodiments disclosed herein may be practiced. The environment 100 includes a server 102 and client devices, hereinafter clients 105 (represented by clients 105a, 105j, and 105n). The server 102 manages a database 104 which may be stored in memory of the server 102. The database 104 stores a set of initial challenge responses 130, which may be generated in response to challenges issued by the server 102 to the clients 105, each of which may respond to the challenges by accessing a respective PUF array 160 represented by the PUF arrays 160a, 160j, and 160n belonging to clients 105a, 105j, and 105n. Alternatively, the server 102 may be otherwise provided with information suitable to generate the initial challenge responses 130.

A PUF array 160 may form parts of an addressable PUF generator (APG), described further below, which may contain additional processing circuitry and execute instructions for generating challenge responses. Enrollment is performed for each client 105 in a secure environment. After enrollment, the constellation of clients 105 may operate in an insecure environment and communicate with each other over public networks. Secure information needs to be encrypted.

Figure 2:
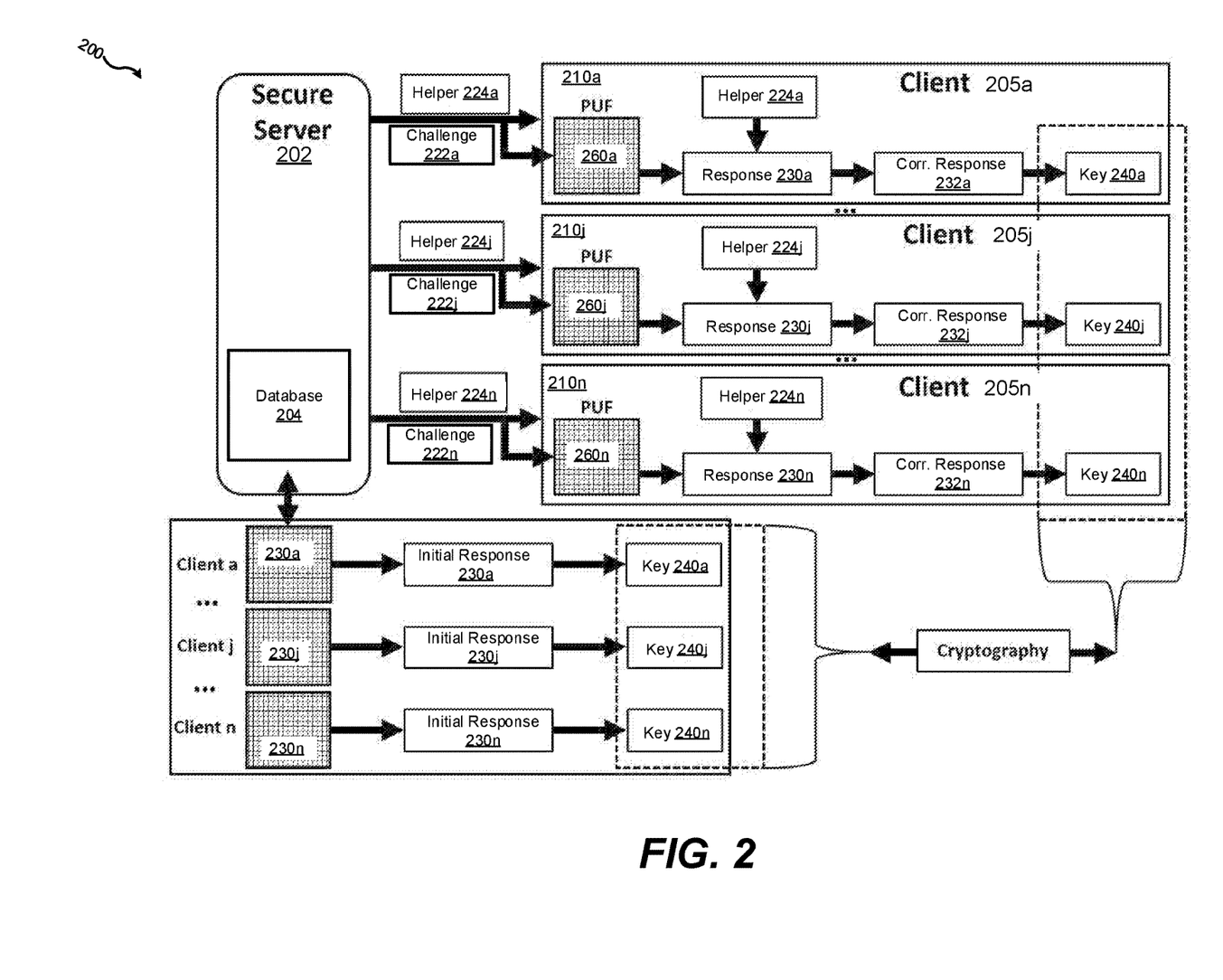
FIG. 2 is a block diagram of client devices with addressable PUF generators (APGs), interacting with a server to independent generates shared encryptions keys according to one embodiment.

FIG. 2 illustrates a simplified example embodiment 200 of clients 205 (i.e., clients {205a, ... 205j, ... 205n}) having APGs 210 (i.e., APGs {210a, ... 210j, ... 210n}) belonging to a client 205, interacting with a server 202 according to embodiments disclosed herein. Each APG 210 includes a PUF array 260 (i.e., APGs {260a, ... 260j, ... 260n}) which may be accessed by a microcontroller or other processing circuitry of each client 205. The PUF array 260 of a client 205 is an array of electronic or other devices with measurable physical characteristics, configured in an addressable array similar to an addressable memory device such as RAM or ROM chip. Due to small variations which occur during semiconductor manufacturing or other manufacturing processes, each PUF device (and hence each PUF array 260) may be unique, even if the PUF arrays are mass-produced by a process designed to produce nominally identical devices. The PUF array 210 (shown as a 2D-array of cells) of a client 205 may be accessed by the client 205 which receives challenges 222 (originating in this example from the server 202). The APG 210 responds by to challenges 222 by generating responses 230 using measured characteristics of one or more PUF devices within the PUF array 260 identified by the challenge 222 or derived from it using instructions stored by the APG 210.

Each client 205 (represented by "Client a", "Client j", and "Client n", i.e clients 205a, 205j, and 205n shown) has an APG 210 containing a PUF array 260 that is unique to that client 205. The APG 210 of a client 205 may be used to generate numerous responses 230 (i.e., responses {230a, ... 230j, ... 230}) unique to that client 205. These responses 230 cannot be replicated by an attacker without physical access to the PUF array 260. During the Enrollment stage, the server 202 may obtain the initial responses 230 for each client 205 by generating all possible challenges 222 and storing responses 230 to those challenges 222 generated by each APG 210 in a database 204. Alternatively, the server 202 may be otherwise supplied with characteristics of each PUF array 260 sufficient to generate the expected responses 230. The microcontroller 220 may include instructions to combine information from the challenge 222 with additional information (such as a user password 223) and pass the combination through a hash function 221 the result to produce the address 225 (or range of addresses) within the PUF array 260 to measure in order to generate the proper response 230.

After the clients 205 are enrolled with the server 202, embodiments disclosed herein may be utilized to authenticated the client 205 and produce an encryption key which the server 202 and client 205 may use to communicate securely. First, the server 202 and a client 205 (such as "Client j" shown in FIG. 2A) enter the Handshaking stage. In the Handshaking stage an objective is for the server 202 to transmit the information needed to identify a particular portion of the PUF array 260 of the client 205. Both the server 202 and the client 205 can independently produce a response to the challenge: the server can lookup information about the PUF array 260 obtained during enrollment (or otherwise supplied to the server 202) and the client 205 can retrieve the same information by using the APG 210 to access the PUF array 260.

During Handshaking, the server 202 issues a challenge 222 to the APG 210 of the client 205. This challenge 222 is used by the APG 210 to identify the portion of the devices belonging to the PUF array 260 to access. This challenge 222 may be a random number. In some embodiments, the server 202 and the client 205 may have access to the same random number generator or may have synchronized random number generators. In such embodiments, the server 202 does not need to transmit the challenge 222 to the client 205 in order for the client 205 to generate the challenge response 230 using the APG 210.

In some embodiments the ability of the client 205 to generate the challenge response 230 may be protected by a password. In such embodiments, the address specifying which device(s) in the PUF array 260 to access may be produced by combining the challenge 222 with the password. As a non-limiting example, the client 205 may input the password and the challenge into a hashing function to produce the address in the PUF array 260. As an example, if the PUF array 260 is represented as a two-dimensional array containing 256 rows and 256 columns, 8 bits of the message digest can be used to find the first coordinate X in the PUF array 260; the following 8 bits can be used to find the second coordinate Y.

As discussed above, the measurement of characteristics of individual PUF devices may not be perfectly deterministic. As part of the Handshaking process, the server 202 may send additional information to the client 205 for use in making generation of the challenge response 230 more reliable. The helper instructions 224 (i.e., helper instructions {224a, ... 224j, ... 224n}) may include a checksum or other error-correcting information for use with error-correcting codes, or other information or instructions used in response generation schemes to be discussed later below. Upon receiving the challenge response 230, the APG 210 may use the helper instructions 224 to generate corrected responses 232 (i.e., corrected responses {232a, ... 232j, ... 232n}). Use of the helper instructions 224 and other methods of improving the reliability of the APG 210 will be discussed further below. The corrected responses 232 may be used directly as encryption keys 240 or may otherwise be used to derive the encryption keys 240. The server 202 may similarly independently produce the encryption keys 240 using the initial responses 230 stored in the database 204. The server 202 and the client 205 may then communicate securely by encrypting messages using the shared encryption keys 240

The server 202 can authenticate a client 205 by issuing the challenge 222 to the client 205 and then comparing the corrected challenge response 232 generated by APG 210 with the initial response to that challenge stored by the server 202 for that client 205 (e.g., initial challenge responses 230) or determine that the corrected challenge response 232 is consistent with the initial challenge response 230 by comparing information derived from the corrected challenge responses 232 with information derived similarly by the server 202 from one of the initial challenge responses 230 corresponding to the challenge 232 issued by the server. The server 202 may require that the corrected response 232 is identical to the expected response to the challenge 222 (i.e., the initial response 230 corresponding to the challenge 222) in order to authenticate the client 205. Alternatively, the server 202 may accept a corrected response 232 with a Hamming distance (or a value of another distance metric) less than a predetermined maximum value from the expected response as evidence that the challenge response 230 is consistent with the expected response. For example, the server 202 may infer that the client 205 has generated a response which differs by less than a predetermined maximum number of symbols from the initial response 230 and determine that the challenge response 230 is consistent with the initial response 230 (i.e., was generated by a client 205 in possession of the same PUF array used to obtain the initial response 230). When the CRP error rates are relatively low, the responses can be used as part of authentication protocols. In such cases, Hamming distances between responses and the expected responses as large as 10% of the total response length may still be used to provide acceptable false-accept and false-reject rates (FRR and FAR). When the CRP error rates are too high, the use of error-correcting methods may be used to improve both FAR and FRR.

As noted above, it is desirable that the CRP error rate of a given APG is low. This becomes even more important if the responses 230 are used to generated encryption keys, as contemplated herein. This is because even a single-bit error in an encryption key may produce a ciphertext which cannot be correctly decrypted. Although the use of helper instructions (e.g., the helper instructions 224) can reduce error rates, such approaches have disadvantages. First, the client devices (e.g., the clients 205) need to consume additional computing resources to implement the helper instructions (e.g., error-correcting codes, fuzzy extractors, et al.). However, in some applications doing so may result in increased complexity and power consumption and may be impractical (e.g., in IoT and other low-power devices). Second, such protocols increase the vulnerability to side-channel attacks, differential power analysis, and potential exposure of the helpers. In addition, the use of APGs to generate challenge responses for use in generating encryption keys is more challenging than using APGs to generate responses for authentication. For example, if the server 202 generates an encryption key (e.g., an encryption key 240) using one of the initial responses 230 and a client 205 attempts to generate the same encryption key from responding to an appropriate challenge 222, the process will fail if the client-generated encryption key differs from the server-generated encryption key by even a single bit. However, typical PUF arrays may exhibit CRP errors at rates of approximately 3-10% due to temperature changes, noise sources, aging, or other parameter drifts. Thus it is important to improve CRP error rates or correct CRP errors. Embodiments disclosed herein may therefore employ various other schemes for reducing CRP error rates.

One approach for dealing with non-zero CRP error rates for encryption-key-generation referred to herein as "response-based-cryptography" or "RBC." RBC may be used independently, or in conjunction with helper instructions other error-mitigation schemes such as ternary PUF schemes described later below to realize improved performance. When used with ternary PUF schemes, effective error rates below the level of $10^{-8}$ may be realized. Furthermore, comparable CRP error rates can be achieved by combining binary PUF error-correction methods capable of achieving CRP rates on the order of $10^{-3}$ on their own with RBC.

Figure 3:
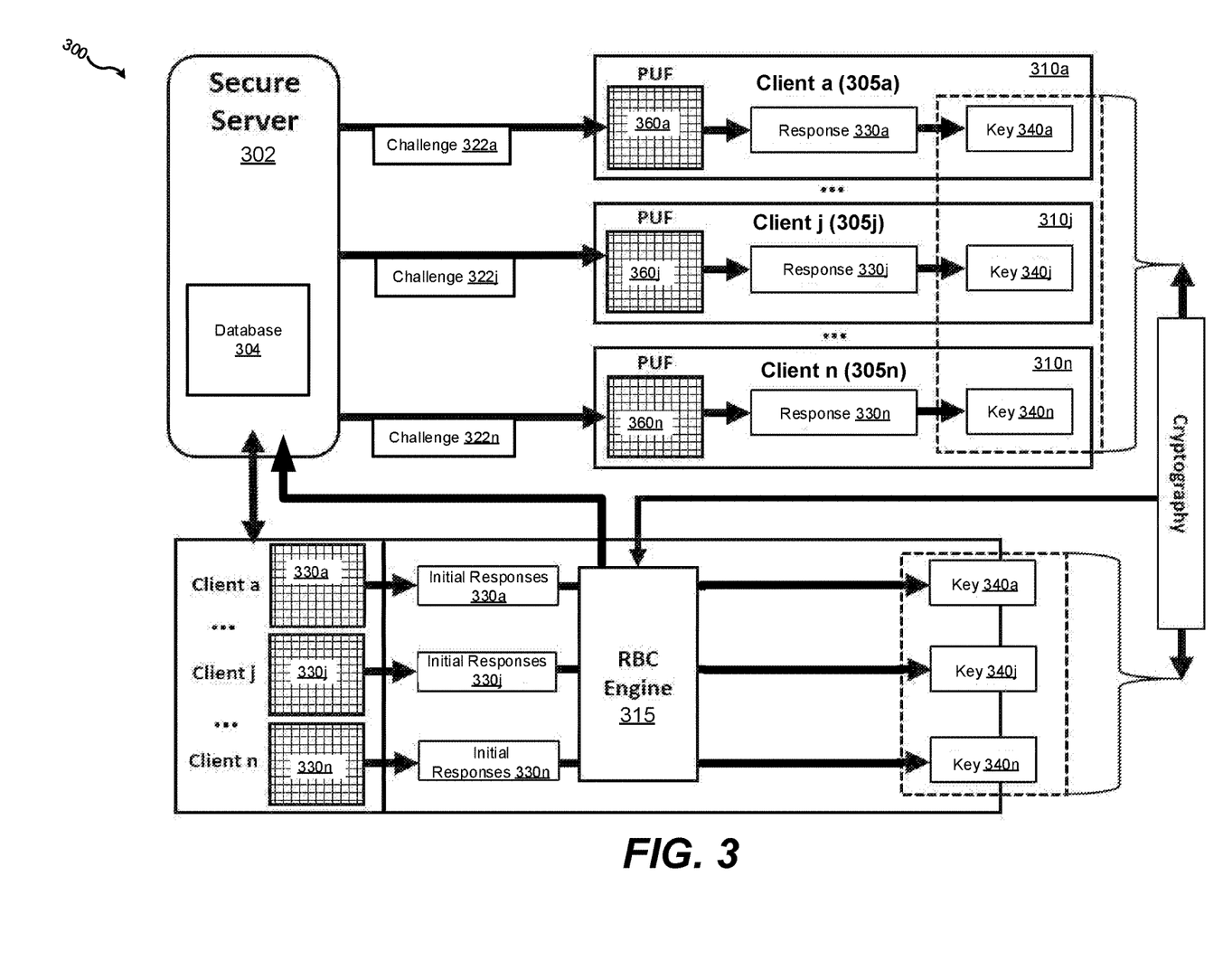
FIG. 3 is a block diagram of client devices with addressable PUF generators (APGs), interacting with a server having response-based cryptography (RBC engine according to one embodiment.

FIG. 3 illustrates and embodiment 300 where a server 302 includes a response-based-cryptography (RBC) engine (RBCE 315). Analogously to the server 202 of embodiment 200, the server 302 of embodiment 300 stores initial responses 330 for APGs 310 of clients 305 having PUF arrays 360 in a database 304. The server 302 receives keys 340 generated by clients 305 using APGs 310. However, in embodiment 300, helper instructions (e.g., the helper instructions 224 of embodiment 200) are not required because the server 302 is provided with the RBCE 315. The purpose of the RBCE 315, is to identify responses 330 from the initial responses 330 which produce encryption keys 340 which the encryption keys 340 generated by the clients 305 when the client-generated responses 330 are consistent with the expected responses 330 to particular challenges 322 issued by the server 302, as illustrated in FIG. 4.

Figure 4:
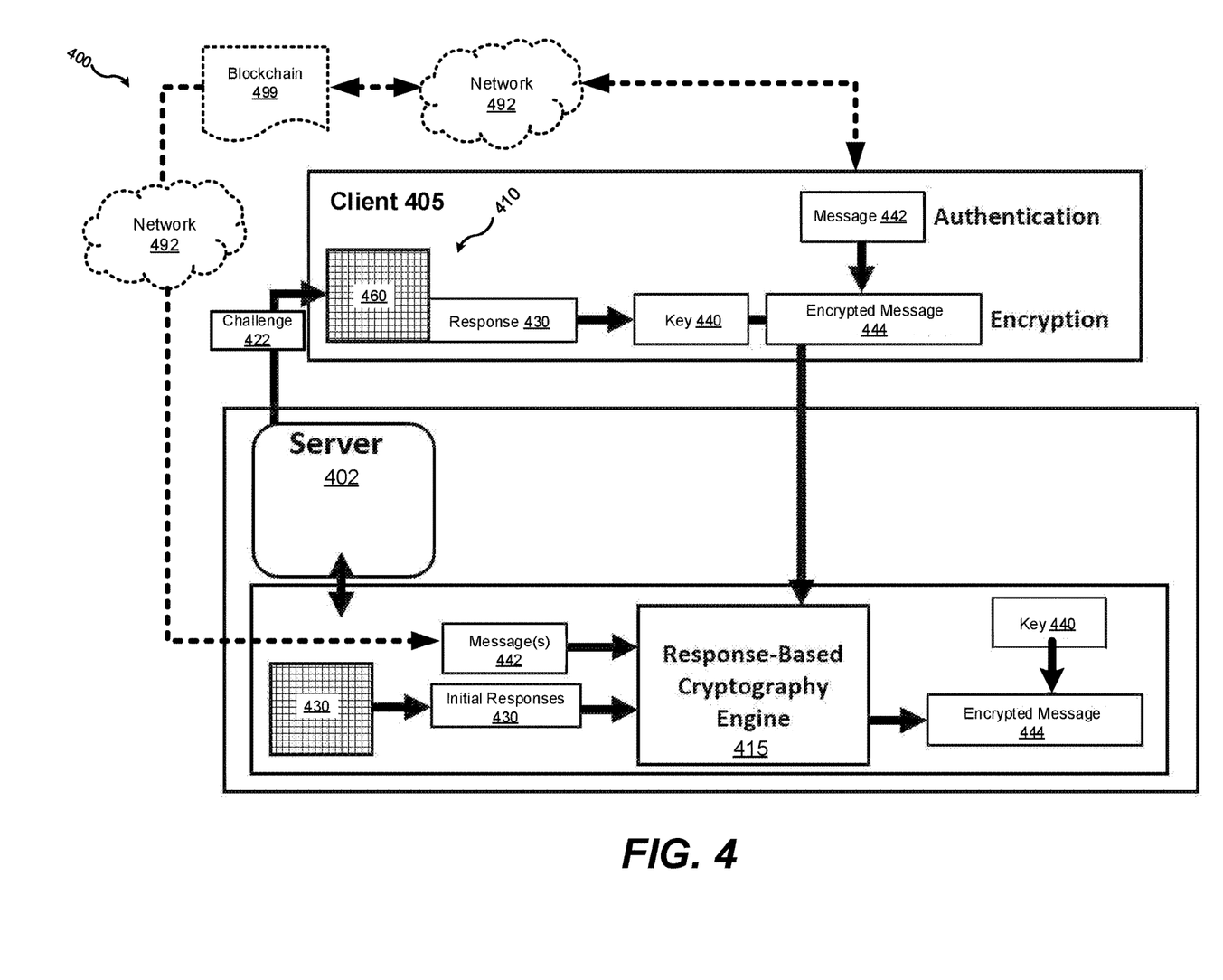
FIG. 4 is a block diagram depicting a procedure of authenticating a client in the embodiment of FIG. 3

FIG. 4 shows an example embodiment 400 in which a server 402 and a client 405 perform an example RBC authentication procedure. In embodiment 400, the server 402 issues an authentication challenge 422 to a client 405. The client 405 uses an APG 410 to generate a response to the authentication challenge 422 using its PUF array 460. The client 405 generates a an encryption key 440 using the response 430. The client 405 then encrypts an authentication message 442 using the key 440 to produce an ciphertext 444 (i.e., a ciphertext). The server 402 uses the RBC engine 415 to independently encrypt the authentication message 442 using the initial response 430 to independently generated the ciphertext 444. If both ciphertexts match, the server 402 knows that it has successfully generated the same encryption key 440 and that the client 405 may be authenticated. In some embodiments, the server 402, rather than independently generating the ciphertext 444, may instead decrypt the ciphertext 444 received from the client 405 and verify that resulting plaintext is the expected authentication message 442 for the client 405. If the ciphertexts (or alternatively, plaintext the authentication messages 442) do not match, the RBC engine 415 may perform additional steps to determine that that they are nevertheless consistent with each other, as described below. Non-limiting examples of acceptable authentications messages include a user ID of the client 405 or other identifying information such as a secret shared by the client 405 and the server 402. In some embodiments, the client 405 and the server 402 may have access to a shared random number generator (RNG) and the shared secret may be a random number generated by that RNG. In other embodiments, the client 405 and the server 405 may be provided with synchronized RNGs. In some embodiments, the server 405 may store the authentication message 442 directly, while in other embodiments, the server 405 may store information related to the authentication message 442 along with instructions for generating the authentication message 442.

In some embodiments, one or both of the server 402 and the client 405 may optionally retrieve the authentication message 442 over a network (e.g., the network 492 shown in FIG. 4) such as a WAN, LAN, or the Internet as non-limiting examples. Various types of information may be used as the authentication message 442. As a non-limiting example, the authentication message 442 may be a blockchain transaction or other block which may have been generated by the client 405 and/or cryptographically signed by the client 405 which identifies the client 405 to the server 402. In this example, the server 402 may optionally retrieve the authentication message 442 from the blockchain 499 as shown in the FIG. 4. Similarly, the client 405 may write information to the blockchain 499 (e.g., a signed transaction block) and later retrieve the authentication message 442 from the blockchain 499 during authentication with the client 402.

For instance, in some embodiments, the client 405 may send a message to the server 402 to authenticate using a transaction block from the blockchain 499 as the authentication message 442. In this instance, the server may retrieve the transaction block identified by the client 405 from the blockchain 499 as the expected authentication message 442 and verify that it identifies the client when processed using methods disclosed above and elsewhere in the present disclosure. In some embodiments, the client 402 may transmit a public encryption key, a cryptographic signature, or other cryptographic output associated with the client as the authentication message 442. A public encryption key may be a public key corresponding to a private key previously used by the client 405 to generate a cryptographically-signed transaction block in the blockchain 499. In embodiments in which the client transmits a message explicitly identifying the corresponding transaction block in the blockchain 499, the sever 402 may access blockchain data of the blockchain 499 over the network 492 in order to retrieve a copy of the corresponding transaction block, public encryption key, cryptographic signature, and/or other cryptographic output from the blockchain 499 and determine that the client 405 may be authenticated as disclosed herein.

In some embodiments where the client 405 uses a public encryption key as the authentication message 442, the server may verify that the public key is associated with an authentic client 405 by a digital signature authority (DSA) by requesting validation of the public from the DSA via the network 492. In some embodiments, the server 405 may itself function as a DSA. In some embodiments the client 405 may transmit a message to the server 402 indicating a particular transaction block in the blockchain 499, signed with an encryption key in response to the challenge 422. The server 402 may use an asymmetric key generation algorithm to verify that that encryption key is a public key corresponding to a private key a generated from the challenge response stored by the server 402 in accordance with an asymmetric cryptographic scheme (e.g., RSA, elliptic curve cryptographic schemes, lattice cartographic schemes, multivariate cryptographic schemes, code-based cryptographic schemes, or another suitable asymmetric cryptographic scheme). In some embodiments, the client 405 may identify a transaction block signed by the client 405 prior to authentication along with a particular challenge 422 which the client 405 previously used to produce an encryption key with which the transaction block was signed by the client 405 as disclosed previously above. In such embodiments, the sever 402 may independently derive an encryption key using the initial response 430 corresponding to that challenge 422 and determine that the client is authentic using methods previously disclosed herein.

Because server 402 does not need to generate and transmit helper messages in embodiments described above, and the clients 405 do not need to have error-correcting schemes to correct the errors in the responses 430, the computing power needed at the client level in such embodiments is reduced, which allows the use of less powerful microcontrollers, smaller memory components, and simpler architectures. The elimination of the need for helper instructions (e.g., the helper instructions 224) also simplifies communication between servers and clients. The latency at the client device is significantly reduced, giving less time for malicious observers to extract relevant information from transactions.

Figure 5:
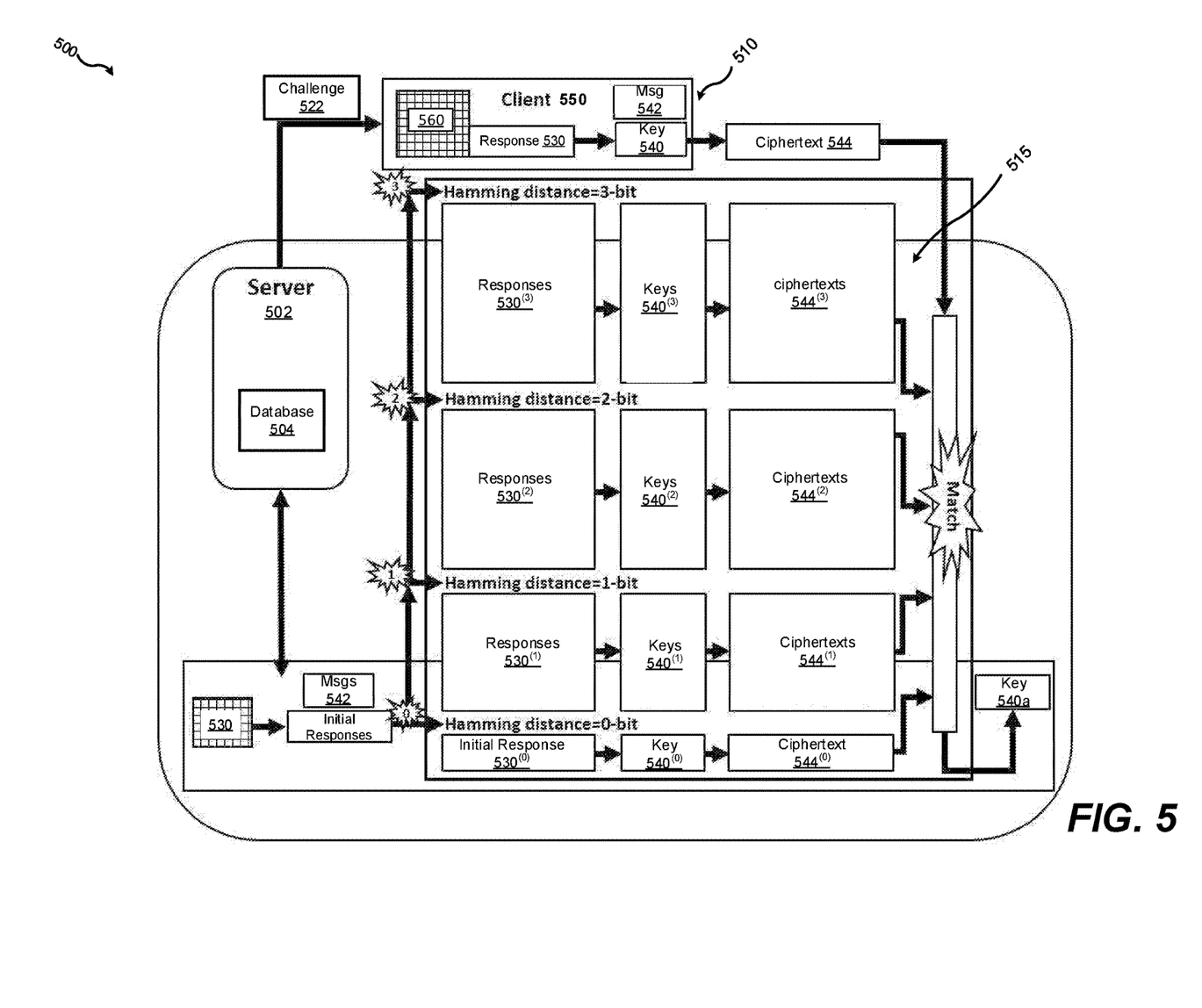
FIG. 5 is a block diagram depicting further details of the authentication procedure of FIG. 4 in some embodiments.

FIG. 5 shows details of an embodiment 500 wherein a server 502 uses an RBCE 515 (e.g., the RBCE 415) to authenticate a client 505 (and also agree upon an encryption key with the client) when the CRP error rate of an APG 510 with a PUF array 560 is non-zero. During Authentication, the client 505 receives the challenge 522 from the server 502. The server 502 stores initial responses 530 generating during Enrollment in a database 504. The client 505 generates an encryption key 540 and encrypts an authentication message 542 with the encryption key 540 to produce the ciphertext 544 and transmits it to the server 502 which uses the RBCE 515 to authenticate the client 505 and generate a matching encryption key 540. The server 502 may use the RBCE 515 to encrypt the same authentication message 542 with one or more encryption keys derived from expected response to the challenge 522 stored in the initial responses 530 for use in determining same encryption key 540 as the client 505. If encrypting the authentication message 542 with one of the server-generated encryption keys reproduces the client-generated ciphertext 544, the server may use that key to encrypt further communications with the client 505.

For example, the RBCE may use the expected response 530 (denoted initial response $530^{(0)}$ to indicate a Hamming distance of zero from the corresponding initial response 530 to generate an expected key 540 (denoted by key $540^{(0)}$) and encrypt the authentication message 542 with the key $540^{(0)}$ to produce an expected ciphertext 544 (denoted by ciphertext $544^{(0)}$. In order to account for possible CRP errors at the client 505, the RBCE 515 may generate additional responses with various Hamming distance from the expected response 530, derive additional keys 540 from those responses and produce additional ciphertext 544. For example, the RBCE 515 may generate a set of responses $530^{(1)}$ having a Hamming distance of one from the expected response 530, generate corresponding encryption keys $540^{(1)}$, and encrypt the authentication message 542 with each of those keys to produce corresponding ciphertext $544^{(1)}$. The RBCE 515 may also similarly generate ciphertext $544^{(2)}$ and $544^{(3)}$ from the authentication message 542 and the respective responses $530^{(2)}$ and $530^{(3)}$ which are sets of responses which differ from the expected response 530 by Hamming distances of two and three, respectively. In some embodiments, the RBCE 515 may be configured to produce additional ciphertexts as described above using responses which differ from the expected response 530 by even greater Hamming distances. In some embodiments, the server 502, rather than independently generating one or more ciphertexts, may instead decrypt the ciphertext 544 received from the client 405 and verify that resulting plaintext is the expected authentication message 442 for the client 405. In other embodiments, the server 502 may compute additional ciphertexts before receiving the client-generated ciphertext 544, thereby lowering latency of the Authentication phase. In some such embodiments, the additional responses may be pre-computed and stored by the server at any time after the Enrollment phase.

In some embodiments, a client 505 may transmit a public encryption key to the server 502 instead of an encrypted authentication message 542 (e.g., a ciphertext 544). The public encryption key may generated by the client 505 using the encryption key 540 as a private-key input to an asymmetric key generation algorithm, resulting in a private/public key pair according to an acceptable asymmetric encryption scheme. The server 502 may then independently generate such a public key using expected responses derived from the initial responses 530 generated during Enrollment. Non-limiting examples of acceptable asymmetric encryption schemes for include RSA, Elliptic Curve Cryptography (ECC), lattice cryptography schemes, code-based cryptography schemes, multivariate cryptography, and others.

Figure 6:
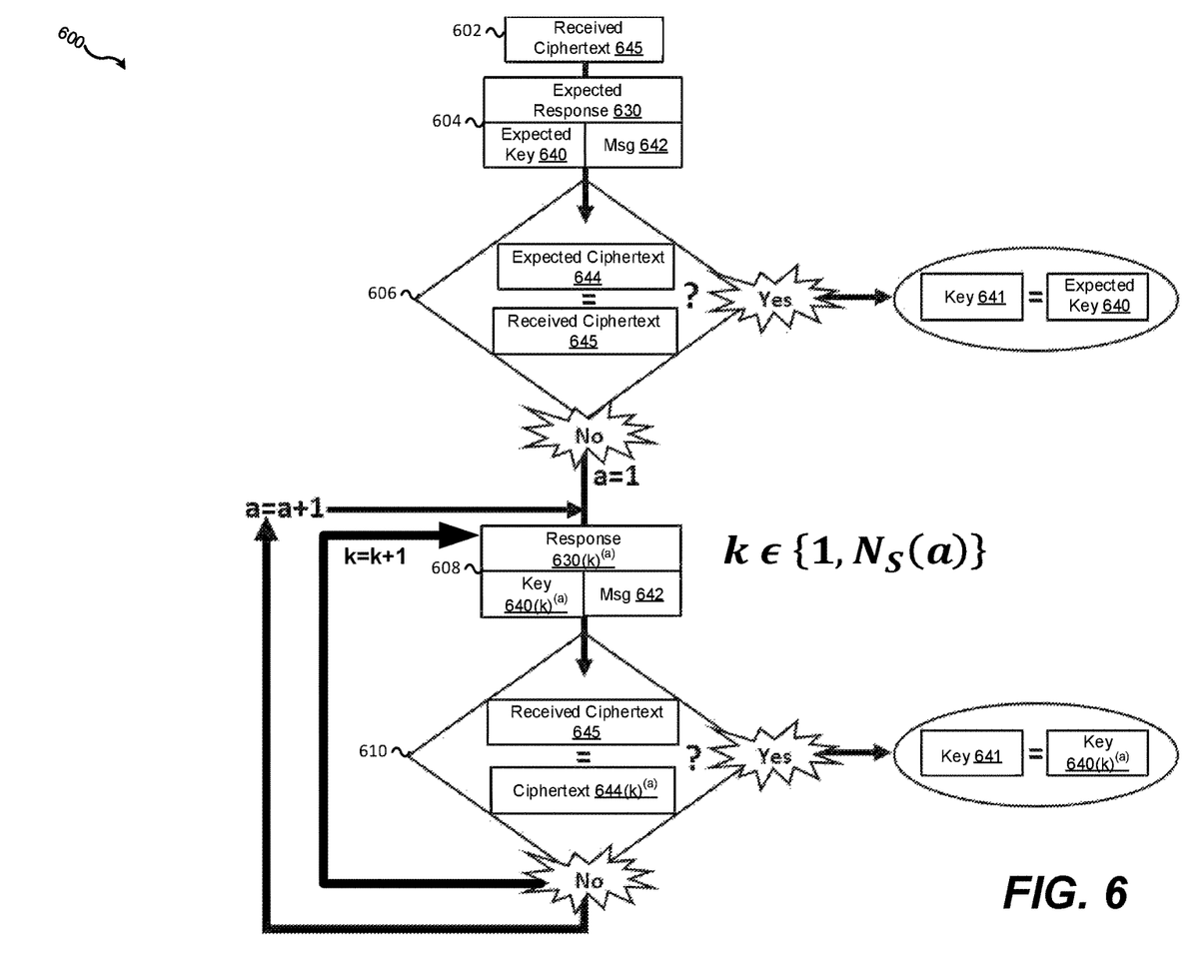
FIG. 6 is a flow diagram illustrating the authentication procedure of FIG. 5

FIG. 6 depicts an example response-based cryptography procedure 600 which may be performed by a system (e.g., the server 502 with RBCE 515). At step 602 the system receives a ciphertext 645 generated by a client (e.g., the client 505) using an encryption key 641 derived from a response to a challenge issued to the client. At step 604 the system encrypts an authentication message 642 with an expected encryption key 640 derived from an expected response 630 to the challenge to produce an expected ciphertext 644. At step 606 the system determines whether the expected ciphertext 644 is identical to the received ciphertext 645. If so, the expected key 640 must be the same as the client-generated key 641 and the plaintext of the ciphertext must be the same as the authentication message 642. The system may therefore determine that the client is authenticated and continue to communicate with the client using the encryption key 641.

If the received ciphertext 645 differs from the expected ciphertext 644, the system may proceed to step 608. At step 608 the system retrieves one of k possible ciphertexts 644$(k)^{(a)}$ generated by encrypting the authentication message 642 with a corresponding encryption key 640$(k)^{(a)}$ derived from one of k responses 630$(k)^{(a)}$ having a Hamming distance of a from the expected response 630. The system begins with a=1 and proceeds to determine whether the first ciphertext 644$(k)^{(a)}$ (i.e., a ciphertext 644$(1)^{(1)}$) is identical to the expected ciphertext 645. If so, the corresponding encryption key (i.e., 640$(1)^{(1)}$) must be the same as the client-generated key 641 and the plaintext of the ciphertext must be the same as the authentication message 642 and may therefore determine that the client is authenticated and continue to communicate with the client using the encryption key 641. If the two ciphertexts are not identical, the system increments the value of k and repeats steps 608 and 610 until a match has been found or until all possibilities up to k=$N_s$(a) with a=1 have been tried, where $N_s$(a) is the number of unique strings having a Hamming distance of exactly one from the expected response 630. If no matches are found, the system increments the Hamming distance a and repeats steps 608 and 610 until a match is found or all possibilities are exhausted up to a predetermined threshold value of the Hamming distance a. In some embodiments the maximum Hamming distance may be specified by a user. In some embodiments, the system may determine the maximum Hamming distance to meet specified constraints such as a maximum amount of time allotted for completion of the procedure 600 or a maximum consumption of computing resources allowed, as non-limiting examples.

If the computing power of the server device is effectively unlimited, the authentication procedure 600 may iterate with increasing Hamming distance until a matching ciphertext (and thus a matching encryption key) is identified. In such cases, the computing burden is placed on almost entirely on the system (e.g., the server 502). However, infinite computing power does not exist; therefore the above systems and methods are is limited to PUFs with CRP error rates that are low enough and have small Hamming distances between challenges and responses. The trade-off computing power at various levels of PUF quality is described below in connection to FIGS. 7-8.

Figure 7:
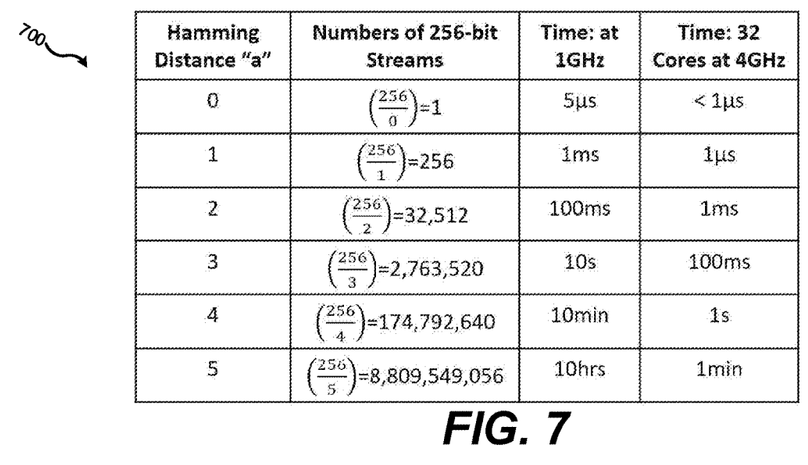
FIG. 7 is table showing estimates for the time required to generate alternative responses according to embodiments disclosed herein with varying computing resources.

FIG. 7 shows a table 700 which lists the number of unique bitstreams having a Hamming distance a from a given 256-bit bitstream. In order to demonstrate the practicality of RBC, we estimate how much time is needed to generate all response streams (e.g., the k responses 630$(k)^{(a)}$ for all values of k in the interval {1, $N_s$(a)} with the Hamming distance a, use them to use them to generate encryption keys, and to encrypt a message (e.g., the authentication message 642) for the purpose of matching ciphertexts as in procedure 600. If we assume that the response is 256-bit bitstream, the number of possible streams, $N_s$(a)=256−choose−a. Table 700 also shows the number of possible bitstreams along with time required using a single 1-GHz microprocessor core, as well as the time required using 32 4-GHz microprocessor cores.

In some instances, it may be more efficient for a server using RBC protocols described above to issue a new challenge in response to CRP errors, rather than continuing to search for matches based on additional responses with increasing Hamming distances from and expected response. Metrics related to such tradeoffs are summarized in FIG. 8 which shows a table 800 with columns 810, 820, and 830. Each row of the table 800 corresponds to an assumed CRP error-rate for a hypothetical APG. Column 810 summarizes the false rejection rate (FRR) expected for a particular combination of CRP error rate and acceptable Hamming distance, a. Each sub-column 810a-810d corresponds to a labeled value of a. For example, when the likelihood that any given bit in a 256-bit response will experience an error is 3%, there is a 96% likelihood that the response will differ by 2 or more bit values form the expected response (i.e., a 96% likelihood of 2 or more bit errors in a single response). The FRR for a given maximum acceptable Hamming distance may be reduced if the server is allowed to issue additional challenges ("queries") because the likelihood that of obtaining a low-error response increases with the number of queries. However, from a security standpoint, it is better to reduce the number of client-server interactions (i.e., reduce the number of queries) because each interaction exposes information about the authentication system which may be intercepted and could be used to identify exploits over time. At the same time, the authentication process should be as fast as possible.

Figure 8:
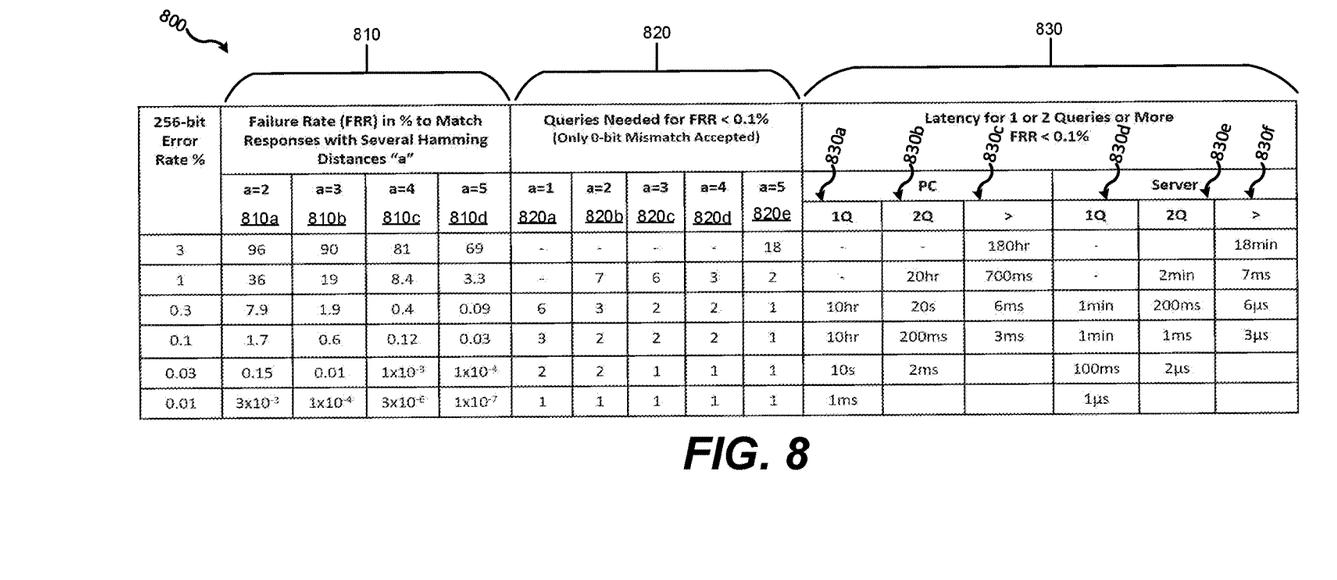
FIG. 8 is table illustrating performance characteristics of embodiments herein using PUFs under various assumptions of PUF error-rates.

Column 820 summarizes a number of attempts required to achieve an FRR of less than 0.1% for different labeled values of a (see sub-columns 820a-820e). For example, it is impossible achieve an FRR of less than 0.1% in an APG with a 3% CRP error rate when the maximum allowable Hamming distance is less than 5 bits. Furthermore, even when a=5, up to 18 attempts must be allowed to ensure an aggregate FRR less than 0.1% Meanwhile, when the CRP error rate is 0.01% an aggregate FRR of less than 0.1% is possible with any value of a greater or equal to one using only a single query.

Column 830 presents latency estimates for the server and the client using AES encryption to generate the ciphertexts when other variables have been chosen to ensure the FRR is less than 0.1% subject to the constraint of one allowed query, two allowed queries, as well as the shortest possible latency using more than two queries when latencies are undesirably high even with two allowed queries for each authentication transaction (see sub-columns 830a-830c for client-side latency estimates and sub-columns 830d-830f for server-side latency estimates). For example, when the CRP error rate is 3% the client-side latency at FRR=0.1% is 180 hours and the server-side latency is 18 minutes. Meanwhile, when the CRP error rate is 0.01%, only one query per transaction is required and the client and server-side latencies are 1 ms and 1 µs, respectively.

The latency estimates above are made based on typical computing performance of a commercially-available low end microcontroller for the client (e.g., a 100 MHz 16-bit RISC processor) and a and typical computing power of commercially-available low-end personal computer for the server (e.g., a 1 GHz 64-bit microprocessor).

The estimates in table 800 illustrate the desirability of low CRP error rates for use with RBC schemes disclosed herein. In some embodiments, RBC techniques may be augmented with techniques to reduce the native CRP error rates of an APG. One such CRP reduction technique includes characterizing each PUF device in a PUF array (e.g., a PUF array 160, 260, 360). During Enrollment, the server issues each possible challenge repeatedly and tracks the statistical distribution of values included in the challenge responses The server then assigns the elements of each challenge response corresponding to individual PUF devices to one of three ternary states, which will be referred to using the ternary digits {−, x, +}. Measured device characteristics which fall within a first range of values are assigned the ternary value '−' Measured device characteristics which fall within a second range of values exclusive of the first range are assigned the ternary value '+'. Measured device characteristics which fall within a third range of values exclusive of the first range and the second range are assigned the ternary value 'x'.

For example, if the PUF devices are SRAM cells, the measured device characteristics may be the frequency of the binary data states stored by the SRAM cells after power cycling. Cells which are always (or almost always) in the '0' state may be assigned to the '−' ternary state, while cells which always in the '1' state may be assigned to the '+' ternary state. Meanwhile, cells which are "unreliable" fluctuate between the '0' and '1' state may be assigned to the 'x' ternary state. The resulting ternary representations may be stored by the server in the database as initial challenge responses for the clients. The server may disregard values generated using unreliable cells when comparing challenge responses to expected challenge response. In some embodiments, the may send instructions to exclude previously-characterized unreliable cells to the client. For example, if a challenge requires a 256-bit response the instructions may instruct the client to select the first 256 devices which are not excluded from the challenge generation process started at a given address The CRP rate can be significantly reduced using this approach when a sufficiently large number of initial responses are gathered in response to each challenge. In some embodiments the server shares the location of the unreliable cells with the clients during the Enrollment process, thereby reducing the size of the instructions transmitted by the server during subsequent authentication and generation of challenge responses by the clients since the clients are able to store the information necessary to exclude the unreliable cells from the challenge generation process.

Figure 9:
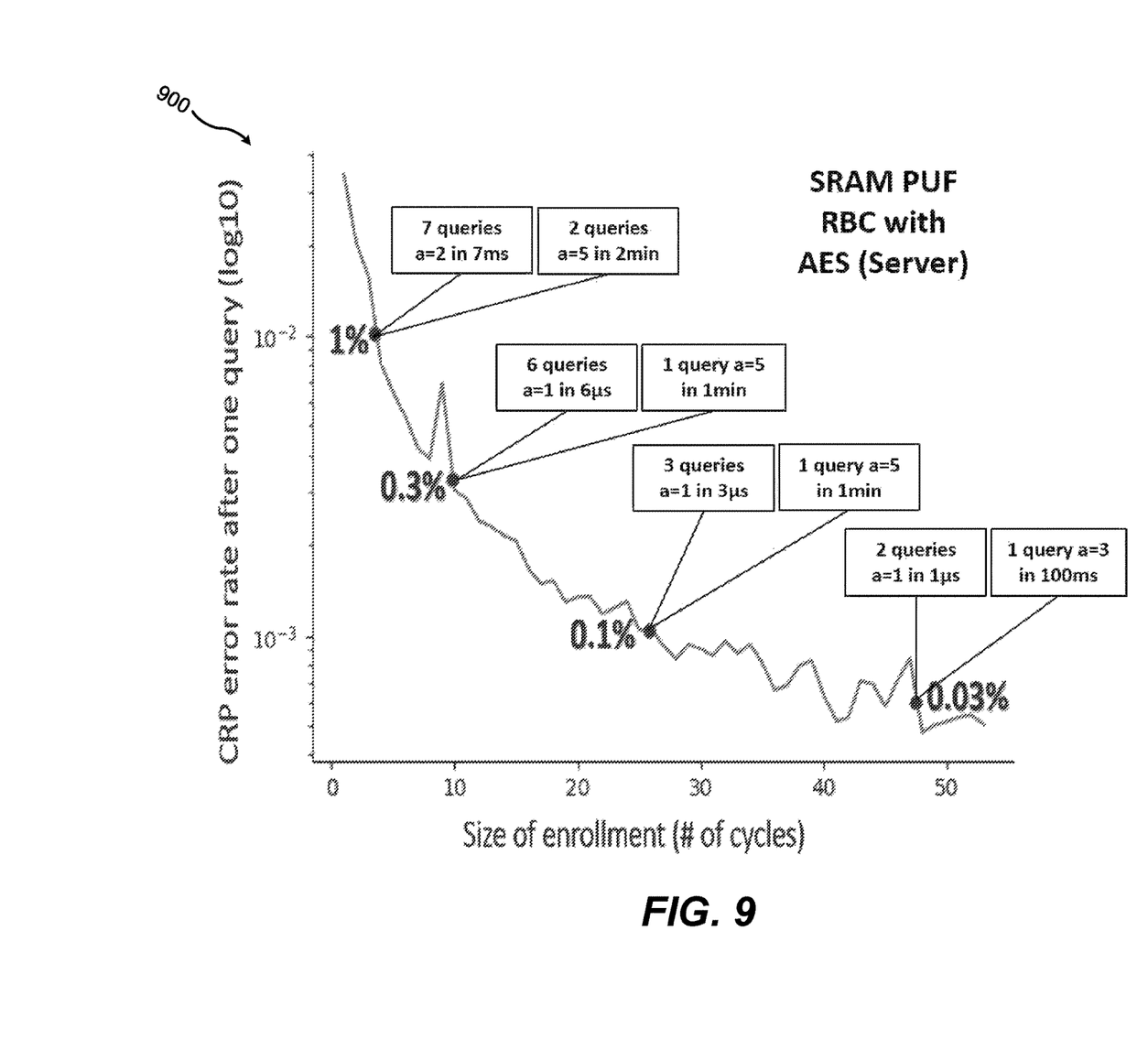
FIG. 9 is a graph showing measured challenge-response pair (CRP) error for an of an SRAM-based PUF array PUF array and corresponding performance levels of embodiments herein utilizing such a PUF array.

FIG. 9 shows measured CRP error-rate data from an APG constructed using a 32-kByte commercial SRAM produced by Cypress Semiconductor Corp. and configured to exclude unreliable cells as described above. As shown in FIG. 9, the CRP error rate is reduced when the SRAM is tested multiple times and unreliable cells are excluded from the challenge response generation process. Increasing the number of measurements for each possible challenge increases the accuracy with which unreliable cells are identified and excluded. After only three cycles, the CRP error rate of the remaining cells drops below 1%. After 8 cycles the CRP error rate drops below 0.3%. after 27 cycles the CRP error rate drops to 0.1%, and drops further to 0.03% after 47 cycles. In this protocol with the use of ternary states, approximately 50 cycles are used to realize a PUF with CRP error rates below 0.03%. Overlaid summary data indicates performance of RBC authentication at various error rates. For example, at 0.03%, RBC authentication with 0.1% FRR can be done within 1 µs (2 queries, a=1), or 100 ms (1 query, a=3), These experimental results demonstrate the practicality of RBC protocols disclosed herein.

It should be understood that, unless explicitly stated or otherwise required, the features disclosed in embodiments explicitly described herein and elsewhere in this disclosure may be used in any suitable combinations. Thus, as a non-limiting example, any embodiment disclosed herein may use the public-key matching techniques disclosed herein or omit said techniques, as dictated by the needs of a particular application. Similarly, any embodiment may use or omit use of the index instructions disclosed herein, and so on.

The invention claimed is:

1. A method, comprising:
   selecting, as an authentication challenge, a first enrollment challenge retrieved from a database and belonging to a challenge-response pair associated with a client device possessing a physical-unclonable-function ("PUF") array having a plurality of PUF devices;
   determining an expected response to the authentication challenge using an enrollment response belonging to the challenge-response pair from the database previously generated in response to the first enrollment challenge by measuring physical characteristics of PUF devices of a portion of the PUF array identified by the first enrollment challenge;
   issuing the authentication challenge to the client device;
   receiving a message identifying a ciphertext from the client device;
   determining, using the ciphertext and a server-generated encryption key, that a value of a difference metric indicating a degree of difference between an authentication response generated by the client device and the expected response is less than a predetermined maximum value of the difference metric; and
   transmitting a notification to the client device indicating that the client device has been successfully authenticated.

2. The method of claim 1, wherein the message identifying the ciphertext identifies a transaction block belonging to a blockchain; and wherein the method further comprises:
   retrieving the transaction block identified by the message from the blockchain; and
   selecting an expected authentication message associated with the client device from the transaction block; and
   wherein determining that the value of the difference metric between the authentication response and the expected response is less than the predetermined maximum value of the difference metric comprises:
   deriving a cryptographic value using the server-generated encryption key and determining that the cryptographic value matches the authentication message.

3. The method of claim 2, wherein deriving the server-generated encryption key from the expected response comprises using the expected response as a private-key input to an asymmetric public key generator and selecting a public key output of the asymmetric public key generator as the server-generated encryption key; and wherein the asymmetric public key generator produces public keys according to an asymmetric cryptography scheme belonging to a class of asymmetric cryptography schemes that includes at least RSA, elliptic curve cryptography, lattice cryptography; code-based cryptography, and multivariate cryptography.

4. The method of claim 1, wherein the method further comprises deriving the server-generated encryption key from the expected response; and wherein determining that the value of the difference metric between the authentication response and the expected response is less than the predetermined maximum value of the difference metric comprises:

generating an expected ciphertext by encrypting an authentication message associated with the client device with the server-generated encryption key; and determining that the received ciphertext is consistent with the expected ciphertext.

5. The method of claim 4, wherein, determining that the value of the difference metric between the authentication response and the expected response is less than the predetermined maximum value of the difference metric comprises:

generating alternative ciphertexts by encrypting an authentication message associated with the client device with respective alternate keys by:

generating a set of alternative responses each having a value of the difference metric indicating a degree of difference from the expected response corresponding to a value less than the predetermined maximum value of the difference metric; and deriving the respective alternative keys from respective alternative responses; and determining that one of the alternative ciphertexts is identical to the received ciphertext.

6. The method of claim 5, wherein the method includes generating one or more of the alternative ciphertexts after selecting the first enrollment challenge as the authentication challenge and before receiving the client-generated ciphertext and storing the one or more alternative ciphertexts.

7. The method of claim 1, wherein the method further comprises deriving the server-generated encryption key from the expected response and wherein determining that the value of the difference metric indicating a between the authentication response and the expected response is less than a predetermined maximum value of the difference metric. comprises:

decrypting the received ciphertext with the server-generated encryption key to produce a received plaintext; and determining whether the received plaintext matches an authentication message associated with the client device.

8. The method of claim 7 wherein, wherein determining that the value of the difference metric between the authentication response and the expected response is less than a predetermined maximum value of the difference metric. further comprises:

generating a set of alternative responses each differing from the expected response by less than the predetermined maximum value of the difference metric;

deriving the respective alternative keys from respective alternative responses; and determining that decrypting the received ciphertext with one of the alternative keys produces the authentication message.

9. The method of claim 1, wherein issuing the authentication challenge to the client device includes:

determining that the authentication challenge identifies a portion of the PUF array that includes an excluded set of PUF devices that previously produced measured physical characteristics within a specified range of values from the authentication response; and instructing the client device to:

exclude measured physical characteristics from the excluded set of PUF devices while generating the authentication response;

measure physical characteristics of a number of additional PUF devices in place of the measured physical characteristics of the set of excluded PUF devices; and use the measured physical characteristics of the additional PUF devices in place of the measured physical characteristics while generating the authentication response.

10. The method of claim 9, wherein the method further comprises providing the client device with information identifying the set of excluded set of PUF devices to the client device.

11. A device, comprising:

a processor, and memory coupled to the processor, the memory storing:

(a) challenge-response pairs, each challenge-response pair associated with one of a plurality of client devices each having a respective physical-unclonable- function ("PUF") array having pluralities of PUF devices, each challenge response pair including an enrollment challenge issued to an associated client device and an initial response to that enrollment challenge obtained from the associated client device and derived from measurements of physical characteristics of PUF devices belonging to the PUF array of the associated client device; and (b) executable instructions that, when executed by the processor, cause the processor to:

select, as an authentication challenge, a first enrollment challenge belonging to a challenge-response pair associated with a client device; and issue the authentication challenge to the client device;

determine an expected response to the authentication challenge using the initial response belonging to the challenge-response pair associated with the client device;

receive a ciphertext generated by the client device with a client-generated encryption key and an authentication response generated by the client device;

determine that the authentication response is consistent with the expected response using the received ciphertext; and transmit a notification to the client device indicating that the client device has been successfully authenticated.

12. The device of claim 11, wherein the instructions, when executed by the processor to determine that the authentication response is consistent with the expected response cause the processor to:

generate a server-generated encryption key derived from the expected response;

encrypt an authentication message associated with the client device with the server-generated encryption key to produce an expected ciphertext; and compare the received ciphertext with the expected ciphertext.

13. The device of claim 12, wherein the instructions, when executed by the processor to derive the server-generated encryption key from the expected response cause the processor to:

determine that the authentication response differs from the expected response;

generate a set of alternative responses that differ from the expected response such that a value of a difference metric indicating a degree of difference between the authentication response and each alternative response is less than a predetermined maximum value of the difference metric;

derive a set of respective alternative encryption keys from the alternative responses;

encrypt the authentication message associated with the client device with each of the alternative encryption keys to generate respective candidate ciphertexts;

determine that a particular candidate ciphertext is identical to the received ciphertext; and select the alternative key used to generate the particular candidate ciphertext as the server-generated encryption key;

generate a server-generated encryption key derived from the expected response;

decrypt the received ciphertext with the server-generated encryption key to produce a received plaintext; and compare the received plaintext with an expected authentication message associated with the client device.

14. The device of claim 13, wherein the instructions, when executed by the processor to derive the server-generated encryption key from the expected response cause the processor to:

determine that the authentication response differs from the expected response;

generate a set of alternative responses that differ from the expected response such that a value of a difference metric indicating a degree of difference between the authentication response and each alternative response is less than a predetermined maximum value of the difference metric;

derive a set of respective alternative encryption keys from the set of alternative responses; and select, as the server-generated encryption key, one of the alternative encryption keys that produces the authentication message associated with the client device when used to decrypt the received ciphertext.

15. The device of claim 11, wherein, wherein the instructions, when executed by the processor to issue the authentication challenge to the client device, cause the processor to instruct the client device to generate a response that:

assigns a first ternary state to any measured physical characteristic having a value within a first range; and assigns a second ternary state to any measured physical characteristic having a value within a second range of values exclusive of the first range;

assigns a third ternary state to any measured physical characteristic having a value within a third range of values exclusive of the first and second ranges.

16. A system, comprising:

a processor, a physical-unclonable-function ("PUF") array of PUF devices, and memory coupled to the processor, the memory storing instructions that, upon execution by the processor, cause the processor to:

transmit an authentication request to a server and receive an authentication challenge from the server in response to the authentication request;

measure physical characteristics of PUF devices forming a portion of the PUF array specified by the authentication challenge;

generate an authentication response based on the measured physical characteristics and transmit the authentication response to the server;

derive a client-generated encryption key from the authentication response;

transmit an expected authentication message to the server as a ciphertext encrypted with the client-generated encryption key; and encrypt further communication with the server using the client-generated encryption key in response to receiving a message confirming successful authentication from the server.

17. The system of claim 16, wherein the memory stores instructions that, upon execution by the processor, cause the processor to:

receive a password from a user of the client device; and access the PUF devices forming the portion of the PUF array specified by the challenge at addresses of the PUF array generated by combining the authentication challenge with a password supplied by a user of the client device.

18. The system of claim 16, wherein the instructions, when executed by the processor, further configure the processor, when generating authentication response, to execute ternary encoding instructions that:

assign a first ternary state to any measured physical characteristic having a value within a first range; and assign a second ternary state to any measured physical characteristic having a value within a second range of values exclusive of the first range;

assign a third ternary state to any measured physical characteristic having a value within a third range of values exclusive of the first and second ranges.

19. The system of claim 18, wherein the instructions, when executed by the processor to generate the authentication response, further configure the processor to:

exclude measured characteristics assigned the third ternary state from the authentication response; and measure physical characteristics of additional PUF devices for each measured characteristic assigned the third ternary state; and include the measured physical characteristics of the additional PUF devices in the authentication response.

20. The system of claim 18, wherein, wherein the instructions, when executed by the processor, configure the processor tor receive the ternary encoding instructions from the server with the authentication challenge.

* * * * *